United States Patent [19]

Kato

[11] Patent Number: 4,616,544
[45] Date of Patent: Oct. 14, 1986

[54] CUTTING MACHINE FOR PREPARING MODELS FOR SPECTACLE LENSES

[75] Inventor: Niro Kato, Sabae, Japan

[73] Assignee: Kabushiki Kaisha Kato Kogei, Japan

[21] Appl. No.: 698,413

[22] Filed: Feb. 5, 1985

[30] Foreign Application Priority Data

Jun. 18, 1984 [JP] Japan .................................. 59-91376
Nov. 1, 1984 [JP] Japan .................................. 59-231977
Dec. 19, 1984 [JP] Japan .................................. 59-269141

[51] Int. Cl.⁴ ............................................ B26D 5/00
[52] U.S. Cl. ...................................... 83/413; 83/521; 83/565; 51/101 LG; 409/104
[58] Field of Search .................. 51/101 LG; 409/104, 409/105, 112, 113, 144, 122, 123; 144/145 R; 83/413, 565, 521, 916

[56] References Cited

U.S. PATENT DOCUMENTS

| | | | |
|---|---|---|---|
| 3,170,374 | 2/1965 | Clar | 51/101 LG |
| 3,769,755 | 11/1973 | Kania | 51/101 LG |
| 3,838,623 | 10/1974 | Schell | 144/145 R |
| 4,517,870 | 5/1985 | Kopp | 83/565 X |

*Primary Examiner*—James M. Meister
*Attorney, Agent, or Firm*—Larson and Taylor

[57] ABSTRACT

A cutting machine for preparing a model for spectacle lenses comprising a base rotatable about its axis by a drive for supporting a spectacle dummy lens or real lens concentrically placed thereon and serving as a model lens, a clamp rotatable with the base and the lens for holding the lens between the base and the clamp, a profiling member adapted to contact the outer periphery of the lens held between the base and the clamp, a rotary head rotatable at the same speed as the base by drive means about an axis parallel with the axis of the base for holding a model work thereon concentrically therewith, and a stationary cutter for cutting the work on the rotary head.

9 Claims, 7 Drawing Figures

CUTTING MACHINE FOR PREPARING MODELS FOR SPECTACLE LENSES

The present invention relates to a cutting machine for preparing models for spectacle lenses.

When a blank for a spectacle lens is to be cut to the desired shape in conformity with the shape of a spectacle frame, a model for spectacle lenses (hereinafter referred to as "model") must be prepared first.

Conventionally, a model is prepared by placing a spectacle frame horizontally on a base with the front side of the frame down, holding the frame in a fixed position by a holder, lightly pressing the forward end of an inverted L-shaped profiling bar against the lens fitting grooved portion of the spectacle frame, mechanically causing the profiling bar to perform a profiling motion along the lens fitting groove of the frame, and cutting a model work to the desired shape by a cutter with the profiling motion. The conventional method has the following problems.

Extreme difficulty is encountered in properly holding the spectacle frame in a horizontal position because the front side of the frame is curved three-dimensionally. It is therefore difficult for the end of the profiling bar to accurately profile the lens fitting grooved portion of the frame, so that the model obtained has a contour conforming to the shape of the spectacle frame only approximately. Further even if the spectacle frame can be held properly horizontally, the frame will not be held in place stably or will be elastically deformed at a thin portion. Consequently, when moving along the unstably held portion or thin portion of the frame under a pressing load, the profiling bar tends to profile the portion as slightly bulged outward by the pressing load. This makes it almost impossible to obtain a model having an accurately shaped contour. Accordingly the model as prepared by the conventional method is not usable a a model for preparing a real spectacle lens but must be manually finished to a proper shape.

The lens fitting portion of spectacle frame readily catches the eye, is very important from the viewpoint of design and is therefore produced usually with a tolerance of the order of up to 1/10 mm. The model obtained by the conventional method is so inaccurate that the error involved can be as large as 1.0 to 1.5 mm. It is said that if the lens fitting portion of the spectacle frame is deformed from the original shape by 2/10 mm, the frame appears to be of different shape. In this respect, the model obtained by the conventional method has a serious problem because of the large error.

The main object of the present invention is to overcome the foregoing drawbacks of the conventional technique and to provide a cutting machine for preparing models by which a work can be cut into a model so sized and shaped in contour that the model is properly fittable into the desired spectacle frame.

Wearers of spectacles may desire to replace one of the spectacle lenses because of a break or for some other reason, or to replace the lenses of sunglasses by dioptric lenses. Accordingly, another object of the invention is to provide a cutting machine by which a work can be accurately cut into a model to meet such need.

Other objects of the invention will become apparent from the following description.

The present invention provides a cutting machine for preparing models which comprises a base rotatable about its axis by drive means for supporting a spectacle dummy lens or real lens concentrically placed thereon and serving as a model lens, a clamp rotatable with the base and the spectacle dummy lens or real lens for holding the lens between the base and the clamp, a profiling member adapted to contact the outer periphery of the lens held between the base and the clamp, a rotary head rotatable at the same speed as the base by drive means about an axis parallel with the axis of the base for holding model work thereon concentrically therewith, and a stationary cutter for cutting the work on the rotary head, the axis of the combination of the base and the clamp, the point of contact of the profiling member with the outer periphery of the lens, the axis of the rotary head and the point of contact of the cutter with the work being aligned in a plane, the profiling member being stationary and the combination of the base and the clamp and the rotary head being slidingly movable together in the direction of alignment of the axes and the contact points, or the combination of the base and the clamp being stationary and the profiling member and the rotary head being slidingly movable together in the direction of alignment, the assembly of the movable components having connected thereto a spring for biasing the assembly so that the profiling member comes into contact with the outer periphery of the lens relative to each other.

According to the present invention, a dummy lens or real lens is removed from the spectacle frame for use as a model lens. The lens is placed on the base, with the point of the lens corresponding to the center of the pupil accurately positioned at the center of the base by suitable means, for example, the means to be described later. The lens is held between the clamp and the base. A model work is fixedly positioned on the rotary head concentrically therewith by suitable means, for example, the means to be described later. When the base and the rotary head are rotated together at the same speed, each about its own axis, the lens and the work also rotate similarly. With this rotation, the combination of the base, the lens and the clamp slidingly moves in the specified direction relative to the profiling member, or the profiling member similarly moves relative to the lens, according to the shape of the contour of the lens to profile the lens. The model work also moves with the rotary head to perform the same profiling motion and is cut as required by the stationary cutter.

Thus according to the invention, the model work is cut by profiling a spectacle dummy lens or real lens as a model lens. This assures that the work will be cut into a model which is identical with the lens in size and shape, i.e., which properly fits to the lens fitting portion of the desired spectacle frame, insofar as the pupil-corresponding point of the lens is positioned at the center of rotation of the base when the lens is held between the base and the clamp. This is because as is well known in the art, the spectacle dummy lens is made based on the model for shaping the lens fitting portion of spectacle frame and is so sized and shaped as to snugly fit to the lens fitting portion of the frame and further because the actual lens is also properly fittable to the lens fitting portion of the frame.

Thus, the model obtained according to the invention is in conformity with the lens fitting frame portion in size and shape. This means that the spectacle lens, which is cut to the size and shape of the model, also snugly fits to the lens fitting frame portion, with the result that the lens obtained will not deform the lens fitting portion when fitted thereto.

When preparing a lens by cutting, the focus of the lens must be matched to the distance between the user's two pupils. According to the invention, the dummy lens or real lens as mounted on the spectacle frame concerned and worn by the user is checked with reference to the position of the pupil and is marked with a point corresponding to the focus to accurately determine the point. This is a reasonable procedure and is also desirable ophthalmologically.

According to the invention, the base may be provided along its periphery with needle-like projections the tips of which contact the surface of dummy lens placed on the base. The contact of the projection tips with the surface of the dummy lens on the base prevents the dummy lens from being displaced by relative contact pressure between the dummy lens outer periphery and the profiling member due to a biasing spring force. Since the dummy lens is usually made of acrylic resin or like plastic material, the engagement of the projection tips with the lens surface serves to avoid the displacement.

According to the invention, a real spectacle lens serving as a model lens can be set on the base having the needle-like projections with use of a jig having holes coinciding with the projections, by placing the jig on the base with the projections engaged in the holes and fixedly holding the real lens to the jig by suitable means, for example, a double-faced adhesive tape. When thus set in position, the real lens will not be defaced by the projections and is usable again without trouble.

According to the invention, the base may be provided with a gauge for positioning the point of the dummy lens or the real lens corresponding to the center of the pupil at the center of the base, and the clamp may be equipped with a magnifying eyepiece for observing the gauge. The pupil center corresponding point of the dummy lens or the real lens can then be visually checked easily through the eyepiece with reference to the gauge, hence convenient.

According to the invention, the base is preferably provided with means for braking the base during rotation. This assures that even when the lens has a peripheral portion which is inclined like an oblique side of a triangle, the combination of a drive gear and a driven gear meshing therewith is usable as typical drive means for the base for accurately cutting the model work. As is well known, the meshing engagement between a pair of gears involves a backlash, which could entail a trouble in the case where the base carries a lens of such shape and is not provided with brake means. When the lens rotates with the base, with the inclined peripheral portion in contact with the profiling member, the contact pressure of the profiling member on the portion or of the portion on the member due to a spring biasing action pushes the lens at the inclined portion, with the resulting likelihood that the lens will be displaced in the direction of rotation by the amount of backlash, relative to the drive gear included in the pair. If such displacement occurs, the model work is unable to perform a profiling motion in strict accordance with the contour of the lens and to rotate accurately with the base. Consequently the model obtained fails to have a contour of accurate shape. This problem is avoidable when the base is braked during rotation.

Embodiments of the invention will be described below with reference to the accompanying drawings, in which.

Figure 1:
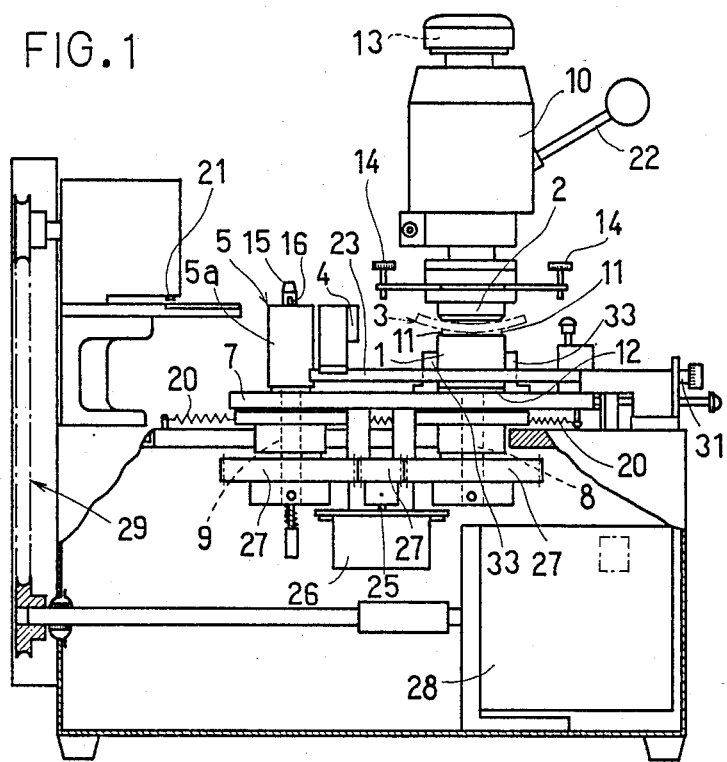
FIG. 1 is a front view showing an embodiment of the invention.

With reference to the drawings, a base 1 is rotatable about its own axis. A clamp 2 is rotatable with the base 1 and a dummy lens 3 which is held between the base 1 and the clamp 2 by being elastically pressed by springs or like means (not shown). A profiling member 4 is adapted to contact the outer periphery of the dummy lens 3 held between the base 1 and the clamp 2. A rotary head 5 for fixedly mounting thereon a model work 6 is rotatable at the same speed as the base 1 about an axis parallel with the axis of the base 1. The profiling member 4 is stationary and is in a fixed position. The combination of the base 1 and the clamp 2, and the rotary head 5 are fixedly mounted on a slider 7 which is slidable horizontally longitudinally of the machine. More specifically, the point of contact of the profiling member 4 with the outer periphery of the dummy lens 3 on the base 1 is positioned on the longitudinal center line of FIG. 2. The slider is provided with first and second spindles 8 and 9, and the base 1 and the head 5 are mounted on the forward ends of these spindles 8 and 9, respectively. Preferably brake means are adapted to act on the base 1 during the rotation thereof. The brake means, which are indicated at 33 in FIG. 1, may be brake shoes of the friction type.

Figure 4:
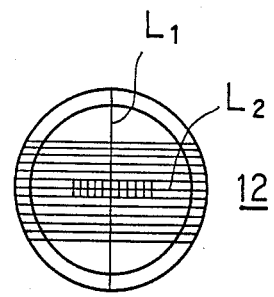
FIG. 4 is a plan view showing a gauge for use in the embodiment.

The base 1 can be in the form of a sleeve made of a substantially transparent suitable material, such as acrylic resin. The clamp 2, including a support frame 10 therefor, may be in the form of a sleeve. Preferably the base 1 is provided with needle-like projections 11 having pointed ends which contact the surface (lower surface in FIG. 1) of the dummy lens 3 held between the base 1 and the clamp 2. These projections 11 are positioned in corresponding relation to the longitudinal reference line $l_1$ and latitudinal reference line $l_2$ on the dummy lens 3 to be described below. It is also desirable that the base 1 be provided at its lower or upper end with a gauge 12 for correctly positioning the point of the dummy lens 3 corresponding to the center of the pupil at the center of the base 1 and that the clamp 2 be provided with a magnifying eyepiece 13 for observing the gauge 12. A preferred gauge is a transparent one. As seen in FIG. 4, the gauge 12 can be a plate marked with a longitudinal reference line L1 and a latitudinal reference line L2 at right angles with the line L1. When required, the clamp 2 may be provided with screws 14 for pressing the peripheral portion of a large dummy lens toward the base 1.

The head 5 is adapted to retain the model work 6 by a centering pin 15 formed at the center of its top end and fittable in a pin hole 17 at the center of the work 6 and work driving pins 16, 16 formed on the top end and fittable into pin holes 18, 18 in the work 6. The work 6 is held to and made rotatable by the head 5 concentrically therewith when the pins 15, 16 and 16 on the head 5 are fitted in the pin holes 17, 18 and 18 in the model work 6. The work 6 or the cut model is removed from the head 5 by suitable known means, for example, by a handle rod 19. When the handle rod 19 is pulled, the head 5 is thereby pulled down relative to a stationary support 5a therefor, whereupon the work 6 or model is removed by being pushed by the end face of the support 5a. The removing mechanism, which is well known to one skilled in the art, is illustrated only schematically.

Figure 2:
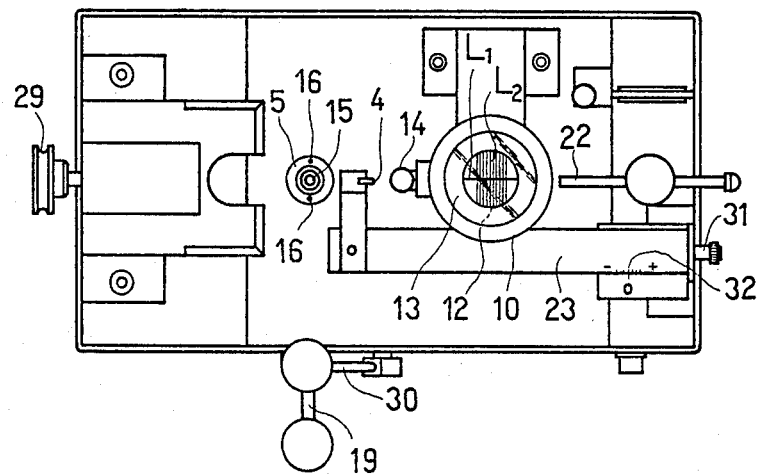
FIG. 2 is a plan view of the embodiment.
Figure 3:
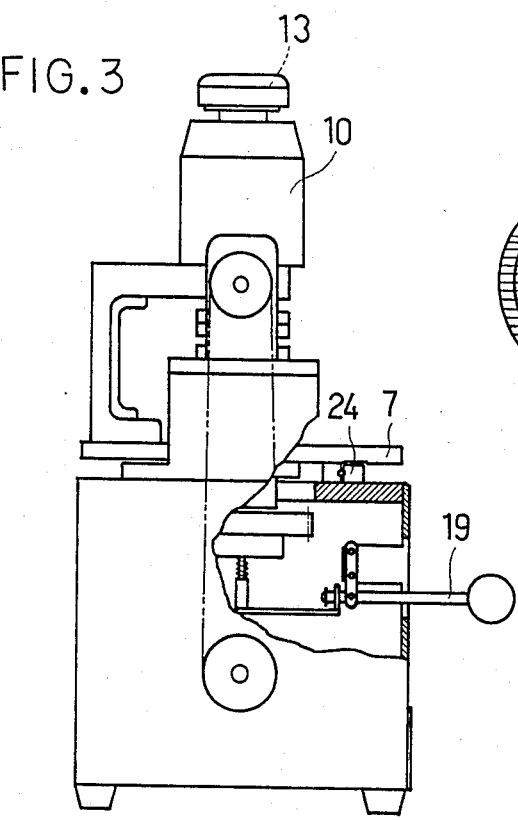
FIG. 3 is a side elevation partly broken away and showing the embodiment.

The slider 7 is provided with springs 20 for biasing the slider 7 leftward in FIG. 1, whereby the outer periphery of the dummy lens 3 held between the base 1 and the clamp 2 is pressed into contact with the profiling member 4.

Indicated at 21 is a cutter in a fixed position for cutting the model work 6 at its outer periphery. The cutter 21 may be a known one for cutting spectacle model works. The outer periphery of the cutter 21 coinciding in position with the outer periphery of the work 6 in finished form on the head 5 is positioned in a vertical plane which contains a line extending through the center of the head 5 in FIG. 2 and the center of the combination of the base 1 and the clamp 2 in FIG. 2. When seen from above, the distance between the above-mentioned outer periphery of the cutter 21 and the point of contact of the profiling member 4 with the outer periphery of the dummy lens 3 on the base 1 is equal to the distance between the axis of rotation of the base 1 and that of the head 5.

Indicated at 22 is a lever for manipulating the clamp 2. When the lever 22 is turned upward, the clamp 2 is lifted through a working means (not shown), whereas when the lever 22 is released, the clamp 2 is depressed by the spring or like means.

A stationary support member 23 has the profiling member 4 mounted thereon. A guide block 24 guides the slider 7 for sliding. Indicated at 25 is a drive shaft which is rotated by a reduction gear 26 coupled directly to an induction motor. Transmission gears 27 transmit the rotation of the drive shaft 25 to the first spindle 8 and the second spindle 9 to rotate these spindles at the number of revolutions which is in the ratio of 1:1. The slider 7 is provided with these drive system and transmission system.

An induction motor 28 for driving the cutter 21 is coupled through a transmission mechanism 29 to a crank mechanism (not shown), which reciprocatingly moves the cutter 21 upward and downward to cut the model work 6. The cutter 21 can be of some other suitable type.

A control lever 30 is shiftable between two positions, i.e. a first position (the position shown in FIG. 2) and a second position (a position away from the first position in a direction corresponding to the counterclockwise direction in FIG. 1). In the first position, the control lever 30 is restrained by a suitable stopper (not shown), for example, by a spring-biased small ball engaged in a cavity. When the control lever 30 is brought to the second position, the slider 7 is freed and subjected to the action of the springs 20, whereupon the outer periphery of the dummy lens 3 held between the base 1 and the clamp 2 is brought into pressing contact with the profiling member 4 by the springs 20. When the control lever 30 is shifted to the first position, the slider 7 is brought to a position where the dummy lens 3 is away from the profiling member 4.

The profiling member 4 is provided with a position adjusting screw 31. When the screw 31 is rotated, the support member 23 for the profiling member 4 is moved leftward or rightward in FIG. 2 to finely adjust the position of the profiling member 4. Indicated at 32 is a scale for showing the amount of position adjustment of the profiling member 4.

The illustrated cutting machine of the present invention operates in the following manner for preparing models.

The clamp 2 is lifted, and a dummy lens 3 removed from a spectacle frame (not shown) is placed in position on the base 1, with the front side of the lens facing the base 1. The dummy lens 3 is accurately positioned relative to the base 1 with respect to angle, with the focus (i.e. the point corresponding to the center of the pupil) of the lens positioned on the axis of rotation of the base 1. The clamp 2 is then released to hold the dummy lens 3 between the base 1 and the clamp 2. The dummy lens 3 may be placed in position by a suitable method, for example, by marking a reference point in coincidence with the center of the pupil on the dummy lens as fitted in the spectacle frame which is worn by the user, removing the dummy lens from the spectacle frame, marking the dummy lens with a longitudinal reference line $l_1$ and a latitudinal reference line $l_2$ through the reference point and at right angles with each other, and causing the lines $l_1$ and $l_2$ to respectively coincide with the longitudinal reference line L1 and the latitudinal reference line L2 on the gauge 12 on the base 1. The dummy lens may be checked for positioning by being observed through the magnifying eyepiece 13 with light admitted through the substantially transparent base 1.

On the other hand, a model work 6 is held to the head 5 in the manner already stated. When required, the work 6 is accurately positioned on the head 5 with respect to angle by the same method as already described for the dummy lens 3.

The control lever 30 is then brought to the second position, whereby the outer periphery of the dummy lens 3 between the base and the clamp 2 is pressed against the profiling member 4 by the action of the springs 20. At this time, the tips of the needle-like projections 11 on the base are in contact with the surface of the dummy lens 3, thereby preventing the displacement of the springloaded dummy lens 3 due to the contact pressure. Since the dummy lens is usually made of a plastic material such as acrylic resin, the tips of the needle-like projections engage in the lens surface to effectively prevent the displacement of the lens 3.

Because the dummy lens 3 is curved like actual lenses, a component force acts on the dummy lens in a direction according to the curve when the outer periphery of the dummy lens held between the base 1 and the clamp is brought into contact with the profiling member 4 by the action of the springs. If the dummy lens is large-sized, the force tends to raise the dummy lens at one side thereof toward the profiling member 4, so that it is desirable to press the peripheral portion of the dummy lens toward the base 1 by the pressing screws 14.

After the dummy lens 3 and the model work 6 have been set in place, the drive shaft 25 is rotated to rotate the first spindle 8 and the second spindle 9 at the same speed, whereby the base 1 and the dummy lens 3, as well as the head 5 and the model work 6, are rotated together. During rotation, the base 1 is braked by the brakes 33.

The above rotation causes the dummy lens 3 and the model work 6 to move with the slider 7 for a profiling motion along the contour of the dummy lens 3 longitudinally of the machine, relative to the profiling member 4.

Accordingly, when the cutter 21 is operated with suitable timing, the model work 6, rotating and performing the profiling motion, is cut in conformity with the contour of the dummy lens.

The present invention is not limited to the foregoing embodiment only but can of course be modified variously without departing from the scope of the invention. Unlike the above embodiment, for example, the combination of the base 1 and the clamp 2 is made stationary, while the combination of the profiling member 4 and the head 5 is made slidingly movable longitudinally of the machine and is further springloaded so that the profiling member 4 comes into contact with the outer periphery of the dummy lens 3 held between the base 1 and the clamp 2. In this case, the second spindle 9 is divided into an output portion for the head 5 and an input portion for the transmission gear 27, and the output and input spindle portions are connected together by Oldham's coupling. When the modified arrangement is to be provided with a lever similar to the lever 30, the lever is modified suitably in accordance with the modification as will be apparent to one skilled in the art.

Figure 7:
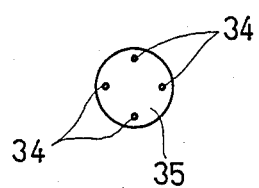
FIG. 7 is a plan view showing a jig.
Figure 5:
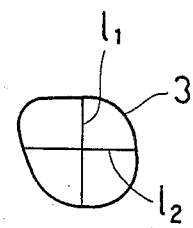
FIG. 5 is a plan view showing an example of dummy lens.
Figure 6:
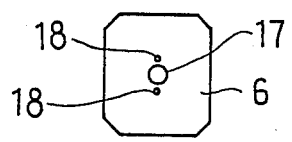
FIG. 6 is a plan view showing a model work.

According to the present invention, a real lens as removed from a spectacle frame is used as a model lens to meet the need of wearer of spectacles who desires to replace one of the spectacle lenses because of a break or for some other reason or to replace the lenses of sunglasses by dioptric lenses. When the base 1 is provided with the needle-like projections 11 in this case, the projections 11 are arranged in coincidence with the longitudinal and latitudinal reference lines L1 and L2, and a plate-like jig 35 (see FIG. 7) is prepared which is curved like spectacle lenses, is smaller than the real lens and has holes 34 coinciding with the needle-like projections. The jig 35 is placed on the base 1 with the projections 11 engaged in the holes 34. The real lens is then attached to the jig 35 with suitable means, for example, a double-faced adhesive tape. The real lens to be used as a model lens is positioned accurately on the base 1 with respect to the axis of rotation and angle by marking the real lens with a longitudinal reference line and a latitudinal reference line like the reference lines l₁ and l₂ on the dummy lens 3, and positioning these lines on the corresponding holes 34 in the jig 35. When thus set in position, the real lens will not be defaced by the needle-like projections and is reusable free of faults.

When the holes 34 to be engaged by the needle-like projections are formed through the thickness of the jig 35 instead of cavities, either of its front and rear sides can be placed in contact with the base. When desired, therefore, the real lens can be set in place with the desired one of its front and rear sides facing the base.

I claim:

1. A cutting machine for preparing a model for spectacle lenses comprises:
    a base rotatable about its axis by drive means and provided with needle-like projections in predetermined positions, the base having concentrically placed thereon a jig with the needle-like projections engaged in holes formed in the jig in coincidence with the projections, the jig being adapted to fixedly hold a real spectacle lens concentrically placed thereon and serving as a model lens,
    a clamp rotatable with the base and the lens for holding the lens between the base and the clamp by elastic pressing means,
    a profiling member adapted to contact the outer periphery of the lens held between the base and the clamp,
    a rotary head rotatable with the base at the same speed as the base by drive means about an axis parallel with the axis of the base for holding a model work thereon concentrically therewith, and
    a stationary cutter for cutting the work on the rotary head,
    wherein the axis of the combination of the base and the clamp, the point of contact of the profiling member with the outer periphery of the lens, the axis of the rotary head and the point of contact of the cutter with the work are aligned in a plane,
    wherein one of the profiling member and the combination of the base and the clamp is slidingly movable in the direction of alignment of the axes and the contact points relative to the other which is stationary such that the rotary head also moves in the direction of alignment in correspondence with the movable one, and
    wherein the movable one has connected thereto a spring for biasing the movable one so that the profiling member comes into contact with the outer periphery of the model relative to each other.

2. A cutting machine as defined in claim 1 wherein the profiling member is stationery, and the combination of the base and the clamp and the rotary head are slidingly movable together in the specified direction.

3. A cutting machine as defined in claim 1 further comprising means for braking the base during rotation.

4. A cutting machine as defined in claim 3 wherein the drive means for the base includes a train of meshing gears.

5. A cutting machine for preparing a model for spectacle lenses comprising:
    a base rotatable about its axis by drive means and provided with needle-like projections along its periphery for placing a spectacle dummy lens thereon with the tips of the projections in contact with the surface of the dummy lens,
    a clamp rotatable with the base and the dummy lens for holding the dummy lens between the base and the clamp by elastic pressing means,
    a profiling member adapted to contact the outer periphery of the dummy lens held between the base and the clamp,
    a rotary head rotatable at the same speed as the base by drive means about an axis parallel with the axis of the base for holding a model work thereon concentrically therewith, and
    a stationary cutter for cutting the work on the rotary head,
    wherein the axis of the combination of the base and the clamp, the point of contact of the profiling member with the outer periphery of the dummy lens, the axis of the rotary head and the point of contact of the cutter with the work are aligned in a plane,
    wherein the base is provided with a gauge for positioning the point of the dummy lens corresponding to the center of the pupil at the center of the base, the clamp being provided with a magnifying eyepiece for observing the gauge,
    wherein one of the profiling member and the combination of the base and the clamp is slidingly movable in the direction of alignment of the axes and the contact points relative to the other which is stationary such that the rotary head also moves in the direction of alignment in correspondence with the movable one, and wherein the movable one has connected thereto a spring for biasing the movable one so that the profiling member comes into contact with the other periphery of the dummy lens relative to each other.

6. A cutting machine as defined in claim 5 wherein the base is substantially transparent to facilitate observation of the gauge through the magnifying eyepiece.

7. A cutting machine as defined in claim 5 wherein the profiling member is stationery, and the combination of the base and the clamp and the rotary head are slidingly movable together in the specified direction.

8. A cutting machine as defined in claim 5 further comprising means for braking the base during rotation.

9. A cutting machine as defined in claim 8 wherein the drive means for the base includes a train of meshing gears.

* * * * *